(12) United States Patent
Antonyraj et al.

(10) Patent No.: US 12,705,181 B2
(45) Date of Patent: Aug. 11, 2026

(54) CLIENT ORIGINATED CACHE KEY MODIFIERS IN EDGE CACHING SYSTEMS

(71) Applicant: Palo Alto Networks, Inc., Santa Clara, CA (US)

(72) Inventors: Rosarin Jolly Roy Antonyraj, Santa Clara, CA (US); Badrinath Natarajan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 128 days.

(21) Appl. No.: 18/585,251

(22) Filed: Feb. 23, 2024

(65) Prior Publication Data

US 2025/0272244 A1 Aug. 28, 2025

(51) Int. Cl.
*G06F 12/0891* (2016.01)

(52) U.S. Cl.
CPC ................................ *G06F 12/0891* (2013.01)

(58) Field of Classification Search
CPC .................................................. G06F 12/0891
See application file for complete search history.

(56) References Cited

U.S. PATENT DOCUMENTS 9,015,416 B2 4/2015 Lientz et al.
9,043,428 B2 5/2015 Lobo et al.
11,418,818 B1 * 8/2022 Tseng ................. H04N 21/4331
11,960,407 B1 * 4/2024 Abd Al Hadi ...... G06F 12/1466
2009/0313384 A1 * 12/2009 Baratakke ........... H04L 61/4511 709/245
2014/0040415 A1 * 2/2014 Mathew ............. G06F 16/9574 709/213
2022/0188266 A1 * 6/2022 Shiell .................... G06F 16/148
2024/0330083 A1 * 10/2024 Wilkins .................. G06F 9/547

OTHER PUBLICATIONS

Aipigee Docs, "Working with cache keys", Apigee Edge, [online] [retrieved on Dec. 29, 23] Retrieved from the Internet: <https://docs.apigee.com/api-platform/reference/policies/working-cachekeys>, 2023.

* cited by examiner

*Primary Examiner* — Sean D Rossiter
(74) *Attorney, Agent, or Firm* — Gilliam IP PLLC

(57) ABSTRACT

Cache keys are modified according to a criterion specified by a requestor that communicates with an edge cache. The requestor determines a cache key modifier based on the criterion and incorporates the cache key modifier into a request for a resource. Determining the cache key modifier based on the criterion can include determining the cache key modifier based on a current time or a "fingerprint" of a previously obtained response. After receiving a request for a resource that indicates the cache key modifier, the edge cache determines a cache key for a lookup in cache memory for the resource and modifies the cache key with the cache key modifier. Modification of a cache key computed for a resource can be achieved with a cache key prefix, infix, or suffix.

20 Claims, 7 Drawing Sheets

CLIENT ORIGINATED CACHE KEY MODIFIERS IN EDGE CACHING SYSTEMS

BACKGROUND

The disclosure generally relates to storing data temporarily at an intermediate stage, such as caching (e.g., CPC subclass H04L 67/658) and to caching (e.g., CPC subclass G06F 16/172).

Edge caching is a technique employed in networks having servers distributed across a geographic area, such as content delivery networks (CDNs) or software-defined wide area networks (SD-WANs), where resources are stored closer to clients in caching servers near the network's edge rather than in a single central location. When used in reference to caching, time-to-live (TTL) refers to the amount of time that cached resources are to be maintained in the cache. Until the TTL expires for a resource, requests for the resource will be served from the cache. Once the TTL expires for a resource, the existing resource will be evicted (i.e., released) from the cache, and the next request for the resource will be served from its origin. Cache eviction, also referred to as purging, is the practice of clearing resources from a cache. Once a resource is evicted from the cache, a request for the resource will be served from its origin rather than from the cache. Cache eviction helps to ensure "freshness" of cached resources in that a resource can be refreshed (i.e., evicted and retrieved from the origin again) in the cache periodically.

Edge caching systems can utilize multiple tiers of cache servers. Multi-tiered edge cache systems comprise a hierarchy of cache servers, where lower-tier cache servers (or "intermediate" cache servers) are closer to users and upper-tier cache servers are closer to origin servers. If a lower-tier cache server does not have a requested resource cached, it requests the resource from an upper-tier cache server. The upper-tier cache server can serve the request with the resource if it has cached the resource or, if the upper-tier cache server also does not have the resource cached, can retrieve the resource from the resource's origin server or from another upper-tier cache server.

BRIEF DESCRIPTION OF THE DRAWINGS

Embodiments of the disclosure may be better understood by referencing the accompanying drawings.

DESCRIPTION

Figure 1:
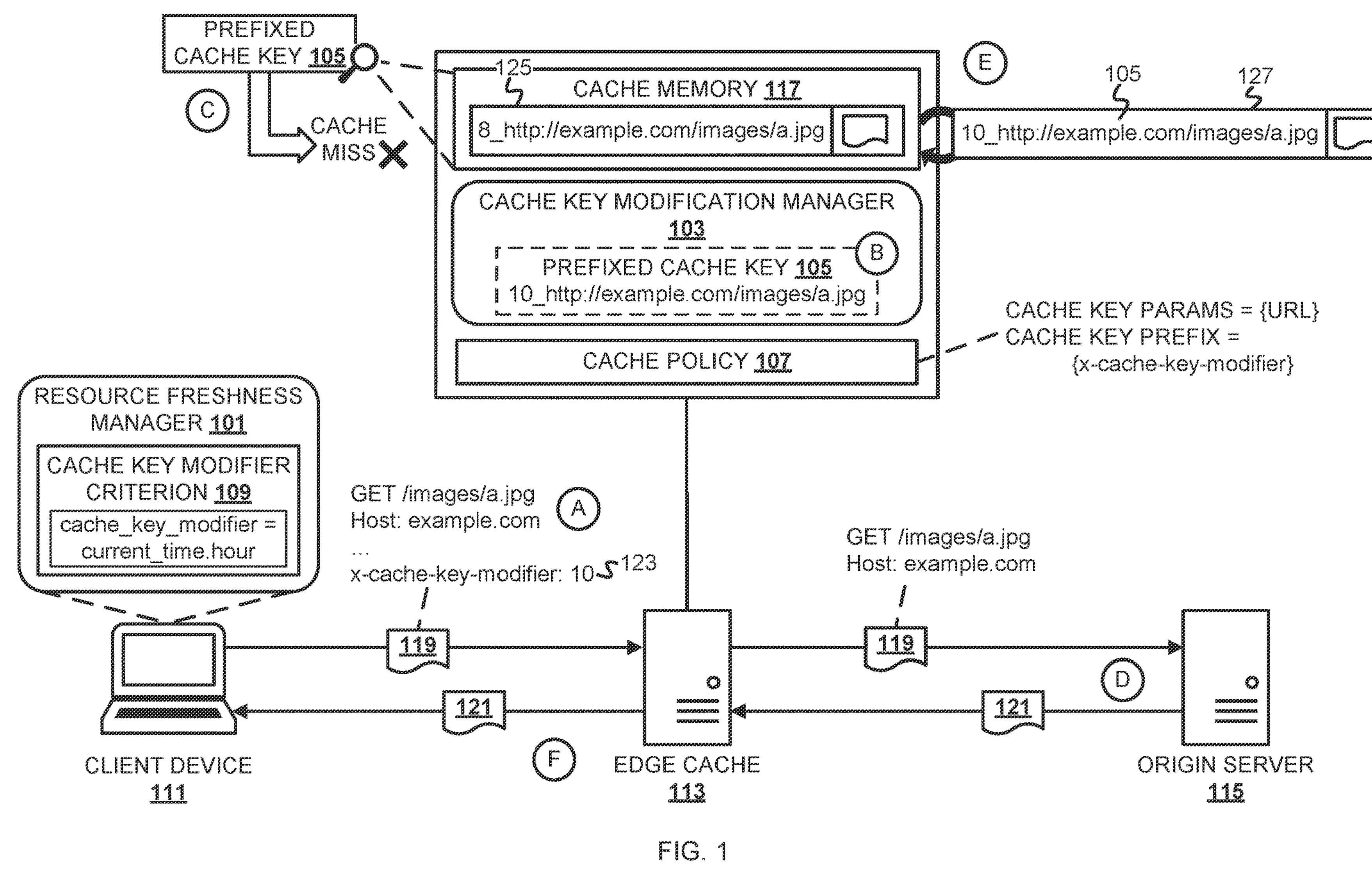
FIG. 1 is a conceptual diagram of using requestor-originated cache key modifiers determined based on time to ensure freshness of retrieved resources.

The description that follows includes example systems, methods, techniques, and program flows to aid in understanding the disclosure and not to limit claim scope. Well-known instruction instances, protocols, structures, and techniques have not been shown in detail for conciseness.

Overview

Maintaining freshness of cached resources in edge caching systems, particularly those in multi-tiered edge caching systems, poses a challenge. One such challenge arises from propagation of the TTL of a cached resource between tiers when requests are fulfilled. A cached resource may be older than its intended TTL since the amount of time elapsed since it was cached or the amount of time remaining until expiration of the TTL is not communicated between servers as requests are fulfilled. To illustrate, consider a resource that is maintained by a second level cache server with a TTL of one hour. When a first level cache server retrieves the resource from the second level cache server, the TTL for the resource cached by the first level cache server will be a full hour regardless of whether the resource was cached by the second level cache server one minute ago or 59 minutes ago. In the latter case, the "age" of the cached resource retrieved from the first level cache server to fulfill requests will effectively be double its TTL. Another challenge arises when resources are dependent on each other and retrieval thereof involves multiple requests (e.g., via a sequence of application programming interface (API) calls). If a first resource is dependent on a second resource, the cache server should ideally refresh the cached version of the first resource each time the second resource is refreshed. However, conventional edge caching systems do not guarantee that this will be the case.

To remedy this, cache keys, or identifiers by which cache memory is searched, can be modified according to freshness criteria specified for cached resources. Modification of a cache key computed for a resource can be achieved through modifying cache keys with a cache key prefix, infix, or suffix. The prefix, infix, or suffix used to modify a cache key that is used to search cache memory for a resource is referred to as a "cache key modifier." Cache key modification is performed by a requestor (e.g., a web browser, proxy server, or intermediate cache server) according to one or more freshness criteria, and the requestor incorporates the cache key modifier in each request for a resource (e.g., in each respective Hypertext Transfer Protocol (HTTP) header). As a result, a cache miss is guaranteed if the version of a cached resource maintained by a cache server receiving the request does not satisfy the freshness criterion based on which the cache key modifier was determined.

A freshness criterion can be based on time such that retrieval of a fresh version of a resource is guaranteed every hour, every N minutes, hours, etc. In this case, the cache key modifier can be determined based on a current time. A freshness criterion can also indicate one or more "fingerprints" of a resource, where the fingerprints are elements that change when the corresponding resource is changed (e.g., modified). Implementation of this freshness criterion is beneficial when retrieval of a resource relies on issuance of a sequence of requests by the requestor, where each subsequent request is dependent on a response obtained for a previous request (e.g., a request for Y depends on a response obtained for a preceding request for X). Thus, if resource Y is dependent on resource X, when the fingerprint associated with X changes, the cache key modifier determined by the requestor will also change, and the requestor will obtain a fresh version of Y. This ensures that the requestor is retrieving a fresh version of X and Y rather than retrieving a stale version of either resource from the cache.

Example Illustrations

FIG. 1 is a conceptual diagram of using requestor-originated cache key modifiers determined based on time to ensure freshness of retrieved resources. FIG. 1 depicts an edge cache 113 and a client device 111. The edge cache 113 is a physical or virtual edge server with caching capabilities. While not depicted in FIG. 1 for simplicity, the edge cache 113 can be one of a plurality of geographically distributed edge caches of a network (e.g., an SD-WAN or CDN). As an illustrative example, the edge cache 113 can cache resources for a particular branch location of an SD-WAN, and the client device 111 may connect to the SD-WAN from this branch location.

A resource freshness manager 101 and a cache key modification manager 103 execute on the client device 111 and the edge cache 113, respectively. The resource freshness manager 101 incorporates cache key modifiers into requests issued by the client device 111. The cache key modification manager 103 identifies cache key modifiers in received requests and generates cache keys according to a cache policy 107 installed on the edge cache 113. The cache policy 107 specifies that cache keys are to be computed from the uniform resource locator (URL) indicated in a request and prefixed with the cache key modifier identified in the request. Thus, upon receipt of a request for a resource, the cache key modification manager 103 computes a cache key that comprises the URL indicated in the request (e.g., as determined based on one or more request header fields or query parameters) and prepends the cache key modifier included in the request to the cache key. The cache key modification manager 103 performs lookups in cache memory 117 with the modified cache key, which comprises the computed cache key and a cache key prefix that is determined based on a received request.

FIG. 1 is annotated with a series of letters A-F. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the resource freshness manager 101 constructs a request 119 comprising a cache key modifier 123 and communicates the request 119 to the edge cache 113. The request 119 is an HTTP GET request for a first resource having an example URL of "http://example.com/images/a.jpg". The resource freshness manager 101 may be configured with a policy to modify outbound requests (e.g., HTTP requests) to incorporate cache key modifiers therein, where the cache key modifier for each request is determined based on a cache key modifier criterion ("criterion") 109. In this example, the resource freshness manager 101 incorporates cache key modifiers into HTTP headers as an X-header field. Constructing the request 119 thus includes determining the cache key modifier 123 according to the criterion 109 and incorporating the cache key modifier 123 as a value in an X-header field of the request 119 for the corresponding resource. While FIG. 1 depicts the resource freshness manager 101 as incorporating cache key modifiers into X-headers of HTTP requests as an illustrative example, implementations can incorporate cache key modifiers into other request header fields, into uniform resource identifier (URI)/URL query parameters.

The criterion 109 in this example is a time-based criterion that specifies that cache key modifiers should be comprised of the current hour of the day. The use of cache key modifiers by the resource freshness manager 101 thus ensures that resources obtained from the edge cache 113 are no older than an hour since cache keys of resources are changed hourly. For instance, the resource freshness manager 101 can determine the current hour using a built-in library for determining date and time, via a system call to get the current time from which it determines the hour, etc. This example assumes that the current hour of the day is 10, so the resource freshness manager 101 determines this as the current hour of the day according to the criterion 109 and constructs the request 119 with an X-header named "x-cache-key-modifier" having a value of 10. The resource freshness manager 101 forwards the request 119 toward the edge cache 113 for fulfillment.

At stage B, the cache key modification manager 103 generates a prefixed cache key 105 according to the cache policy 107. The cache key modification manager 103 obtains the request 119 and identifies the cache key modifier 123 from the request 119. The cache key modification manager 103 has been configured to recognize cache key modifiers from obtained requests, which in this example is based on the corresponding X-header field named "x-cache-key-modifier." The cache key modification manager 103 computes a cache key according to the cache policy 107, identifies the cache key modifier 123 from the request 119, and prepends the computed cache key with the cache key modifier 123. The prefixed cache key 105 that results comprises the cache key modifier 123 prepended to the URL indicated in the request 119, depicted as "10_http://example.com/images/a.jpg" in FIG. 1. This example depicts underscores as separators between cache key prefixes and computed cache keys to which they are prepended, though implementations may use other characters as separators or may omit separators.

At stage C, the cache key modification manager 103 performs a lookup in cache memory 117 with the prefixed cache key 105. While the cache memory 117 in this example is assumed to already include an entry 125 for the resource identified by the URL "http://example.com/images/a.jpg", the cache key for this entry that the cache key modification manager 103 previously determined when caching the resource is "8_http://example.com/images/a.jpg". This indicates that the resource was previously cached when the current hour of the day was 8 and the resource freshness manager 101 indicated the hour of 8 in the cache key modifier field of the corresponding request header (as indicated by the criterion 109). The lookup in cache memory 117 thus results in a cache miss since the prefixed cache key 105 is not presently used as a cache key for a corresponding resource identified in cache memory 117.

At stage D, the cache key modification manager 103 retrieves a new version of the resource identified by the URL "http://example.com/images/a.jpg" from its origin. The cache key modification manager 103 retrieves the new version of the resource to refresh the cached version of the resource. The cache key modification manager 103 forwards the request 119 to an origin server 115 that maintains the resource. The origin server 115 is the original source of the resource, such as a server in a data center or SD-WAN location for which the edge cache 113 caches resources. In response to the request 119, the cache key modification manager 103 obtains a response 121 (e.g., an HTTP response). The response 121 comprises a fresh version of the resource with which to fulfill the request 119.

At stage E, the cache key modification manager 103 refreshes the cached resource with the newly retrieved version and the prefixed cache key 105 as its cache key. The cache key modification manager 103 caches the refreshed version of the resource, which includes creating an entry 127 in cache memory 117 comprising data/metadata identified in the response 121, where the entry 127 has the prefixed cache key 105 as its cache key. Caching the refreshed version of the resource can further include storing the resource identified in the response 121 in storage of the edge cache 113 (not depicted in FIG. 1) and indicating the location in storage in the corresponding entry 127 of cache memory 117 created for the resource.

At stage F, the edge cache 113 provides the response 121 to the client device 111 to fulfill the request 119. The edge cache 113 provides the response 121 to the client device 111 that comprises the new version of the requested resource obtained from the origin server 115. Subsequent requests for the resource identified by the URL "http://example.com/images/a.jpg" that originate from the client device 111 or other client devices that communicate with the edge cache 113 and are configured with the criterion 109 will yield a cache hit until the hour of the day that is incorporated into requests as the cache key modifier changes (i.e., from 10 to 11), which will result in another refreshment of the resource by the edge cache 113 as described above.

Figure 2:
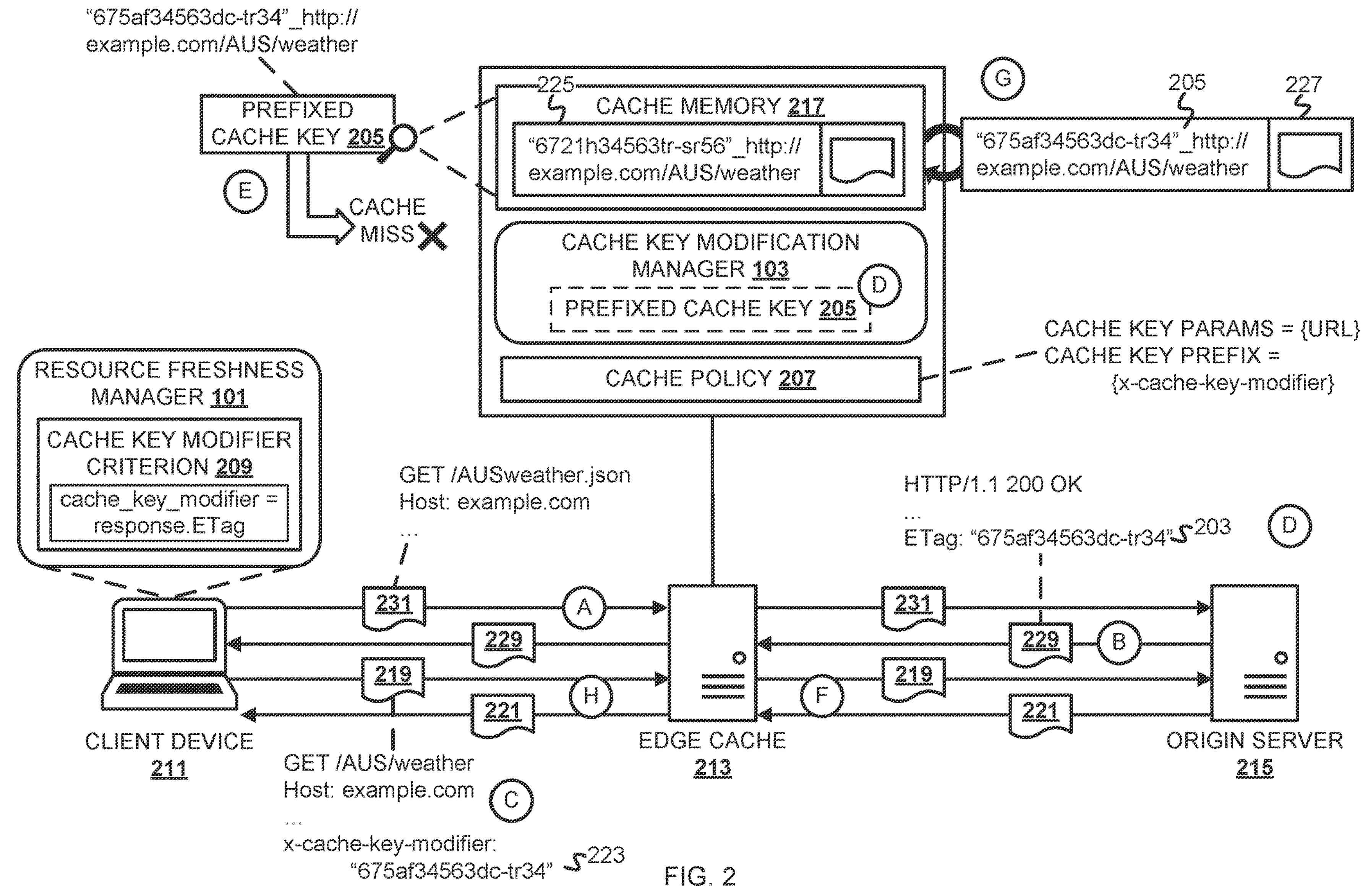
FIG. 2 is a conceptual diagram of using a requestor-originated cache key modifier determined based on a previously received response to ensure freshness of a retrieved resource that is dependent on a previously retrieved resource.

FIG. 2 is a conceptual diagram of using a requestor-originated cache key modifier determined based on a previously received response to ensure freshness of a retrieved resource that is dependent on a previously retrieved resource. FIG. 2 depicts the resource freshness manager 101 executing on a client device 211 and the cache key modification manager 103 executing on an edge cache 213. This example depicts a scenario where an initial request issued by the client device 211 results in a sequence of requests (e.g., via a sequence of application programming interface (API) calls) issued to fulfill the initial request. Each request subsequent to the initial request is thus dependent on a response being obtained that indicates fulfillment of the previous request. In this scenario, the resource freshness manager 101 incorporates a cache key modifier in each request subsequent to the initial request, where the cache key modifier is determined based on the response preceding the request.

In this example, the resource freshness manager 101 is configured with a cache key modifier criterion ("criterion") 209. The criterion 209 indicates that the cache key modifier to include in issued requests should be comprised of an ETag, or entity tag, identified from a previously obtained response. As a result, in the case where fulfillment of an initial request issued by a client device 211 entails issuance of two or more requests (e.g., via two or more corresponding API calls), the resource freshness manager 101 should incorporate a cache key modifier determined according to the criterion 209 into each request subsequent to the initial/first request. This condition for incorporation of cache key modifiers into such "subsequent requests" can be further specified in the criterion 209. The determination of whether an initial request entails issuance of two or more requests (i.e., one or more subsequent requests) may be based on the implementation of the initial request on the client side (e.g., based on the initial request being defined as corresponding to two API calls in the browser/application logic). This example refers to incorporation of ETags into requests as cache key modifiers, though other "response fingerprints" can be determined from received responses and incorporated into a subsequent and related request. Response fingerprints are metadata and/or data that should change when the corresponding resource changes (e.g., is updated or modified). For instance, response fingerprints can be metadata and/or data that can be included in response headers (e.g., in HTTP response header fields). Examples of response fingerprints in addition to ETags include the last modified time of the resource, cache refresh/update time associated with the resource, etc. Last modified time and cache refresh/update times can be utilized as fingerprints in implementations where the resource freshness manager 101 executes on a server that caches resources (e.g., on a proxy server or lower level cache server).

FIG. 2 is annotated with a series of letters A-H. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the resource freshness manager 101 forwards a request 231 for a resource to the edge cache 213. The request 231 in this example is an HTTP GET request for a file named "AUSweather.json" hosted by "example.com". As will be demonstrated in this example, the request 231 is assumed to correspond to an initial API call in a sequence of requests issued to ultimately retrieve the file "AUSweather.json". This example assumes that the lookup for the resource identified in the request 231 in cache memory 217 yields a cache miss such that the edge cache 213 determines that a new version of the resource should be retrieved from its origin server 215. This cache miss may be due to expiration of the corresponding resource that was previously cached, due to the presence of an initial cache key modifier (e.g., a time-based modifier as described in reference to FIG. 1), etc. The edge cache 213 forwards the request 231 to the origin server 215.

At stage B, the edge cache 213 obtains a response 229 to the request 231 from the origin server 215. The response 229 is depicted as an HTTP response comprising an ETag 203 of the resource retrieved from the origin server 215, depicted in FIG. 2 with the string "675af34563dc-tr34" as an illustrative example. While not depicted in FIG. 1 for simplicity, the edge cache 213 can cache the resource identified in the response 229. The edge cache 213 forwards the response 229 to the client device 211.

At stage C, the resource freshness manager 101 constructs a request 219 comprising a cache key modifier 223 and communicates the request 219 to the edge cache 213. The request 219 is an HTTP GET request for a first resource having an example URL of "http://example.com/AUS/weather". The request 219 corresponds to a second API call in a sequence issued to fulfill the request 231. Because the request 219 is one in a sequence and thus depends on the previously obtained response, the resource freshness manager 101 incorporates the cache key modifier 223 into the request 219. As described above, the resource freshness manager 101 may be configured with a policy to modify outbound requests to incorporate cache key modifiers therein, where the cache key modifier for each request is determined based on the criterion 209. Constructing the request 219 thus includes determining the cache key modifier 223 according to the criterion 209 and incorporating the cache key modifier 223 as a value in an X-header field of the request 219. Since the criterion 209 in this example specifies that cache key modifiers should be comprised of an ETag identified in the preceding HTTP response, the resource freshness manager 101 extracts (i.e., copies) the ETag 203 from the response 229 and constructs the request 219 with an X-header named "x-cache-key-modifier" having the ETag 203 as its value. The resource freshness manager 101 forwards the request 219 toward the edge cache 213 for fulfillment.

At stage D, the cache key modification manager 103 generates a prefixed cache key 205 according to a cache policy 207. Like the cache policy 107 of FIG. 1, the cache policy 207 with which the edge cache 213 is configured specifies that cache keys are to be computed from the URL indicated in a request and prefixed with the cache key modifier identified in the request. The cache key modification manager 103 obtains the request 219 and identifies the cache key modifier 223 from the request 219. The cache key modification manager 103 computes a cache key according to the cache policy 207, identifies the cache key modifier 223 from the request 219, and prepends the computed cache key with the cache key modifier 223. The prefixed cache key 205 that results comprises the cache key modifier 223 prepended to the URL indicated in the request 219, depicted as ""675af34563dc-tr34"_http://example.com/AUS/weather" in FIG. 2. As with FIG. 1, this example depicts underscores as separators between cache key prefixes and computed cache keys to which they are prepended, though implementations may use other characters as separators or may omit separators.

At stage E, the cache key modification manager 103 performs a lookup in cache memory 217 with the prefixed cache key 205. While the cache memory 217 in this example is assumed to already include an entry 225 for the resource identified by the URL "http://example.com/AUS/weather", the cache key for this entry that the cache key modification manager 103 previously determined when caching the resource is ""6721h34563tr-sr56"_http://example.com/AUS/weather". This indicates that the resource was previously cached when the preceding response indicated a different ETag that the resource freshness manager 101 identified and incorporated in the associated request as a cache key modifier, and the resource identified by the URL "http://example.com/AUSweather.json" has thus changed. The lookup in cache memory 217 results in a cache miss since the prefixed cache key 205 is not used as a cache key for a corresponding resource identified in cache memory 217.

At stage F, the cache key modification manager 103 retrieves a new version of the resource identified by the URL "http://example.com/AUS/weather" from its origin. The cache key modification manager 103 forwards the request 219 to an origin server 215 that maintains the resource. The origin server 215 is the original source of the resource, such as a server in a data center or SD-WAN location for which the edge cache 213 caches resources. In response to the request 219, the cache key modification manager 103 obtains a response 221 (e.g., an HTTP response). The response 221 comprises a fresh version of the resource with which to fulfill the request 219.

At stage G, the cache key modification manager 103 refreshes the cached resource with the newly retrieved version and the prefixed cache key 205 as its cache key. The cache key modification manager 103 caches the refreshed version of the resource, which includes creating an entry 227 in cache memory 217 comprising data/metadata identified in the response 221, where the entry 227 has the prefixed cache key 205 as its cache key. Caching the refreshed version of the resource can further include storing the resource identified in the response 221 in storage of the edge cache 213 (not depicted in FIG. 1) and indicating the location in storage in the corresponding entry 227 of cache memory 217 created for the resource.

At stage H, the edge cache 213 provides the response 221 to the client device 211 to fulfill the request 219. The edge cache 213 provides the response 221 to the client device 211 that comprises the new version of the requested resource obtained from the origin server 215. Subsequent requests for the resource identified by the URL "http://example.com/AUS/weather" that originate from the client device 211 or other client devices that communicate with the edge cache 213 and are configured with the criterion 209 will yield a cache hit until the content on which this resource is dependent changes and thus results in a change to the corresponding response fingerprint (its ETag in this example), which will result in refreshment of the resource by the edge cache 213 as described above.

While the cache policies 107, 207 in these examples indicate that cache key modifiers are to be used are prefixes to cache keys, in implementations, cache policies can indicate that the cache key modification manager 103 should append or infix cache key modifiers to computed cache keys. The cache key modification manager 103 can thus generate modified cache keys by appending cache key modifiers to computed cache keys or infixing cache key modifiers to computed cache keys in addition to prefixing cache keys with cache key modifiers as described above. In such cases, the cache key modifiers thus serve as cache key suffixes or cache key infixes, respectively.

FIGS. 1 and 2 depict examples where the resource freshness manager 101 executes on a client endpoint that communicates with an edge cache. In implementations, instances of the resource freshness manager 101 can execute on other types of devices that communicate with an edge cache. As an example, the resource freshness manager 101 can execute on a proxy server that retrieves cached resources from an edge cache. As another example, in a multi-tier edge caching system, the resource freshness manager 101 can execute on a lower level cache server that communicates with an upper-level cache server. In such implementations, while the device on which the resource freshness manager 101 executes can act as the client in the client-server model, the device is not necessarily a client endpoint.

Additionally, in multi-tiered edge caching implementations, different pairs of requestors and cache servers can use different cache key modifiers. To illustrate, with reference to FIG. 1, consider an example in which the client device 111 communicates with a lower tier/intermediate cache server, which in turn communicates with the edge cache 113 that acts as an upper tier cache server. The client device 111 can indicate cache key modifiers determined according to a first criterion to the intermediate cache server, while the intermediate cache server can indicate cache key modifiers determined according to a second criterion to the edge cache 113. In other words, multiple pairs of requestors and cache servers do not necessarily use the same cache key modifier for each requestor-cache server pair.

FIGS. 3-6 are flowcharts of example operations. The example operations are described with reference to a resource freshness manager and a cache key modification manager, which can respectively execute on a requestor (e.g., a client endpoint, a proxy server, etc.) and a cache server, for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
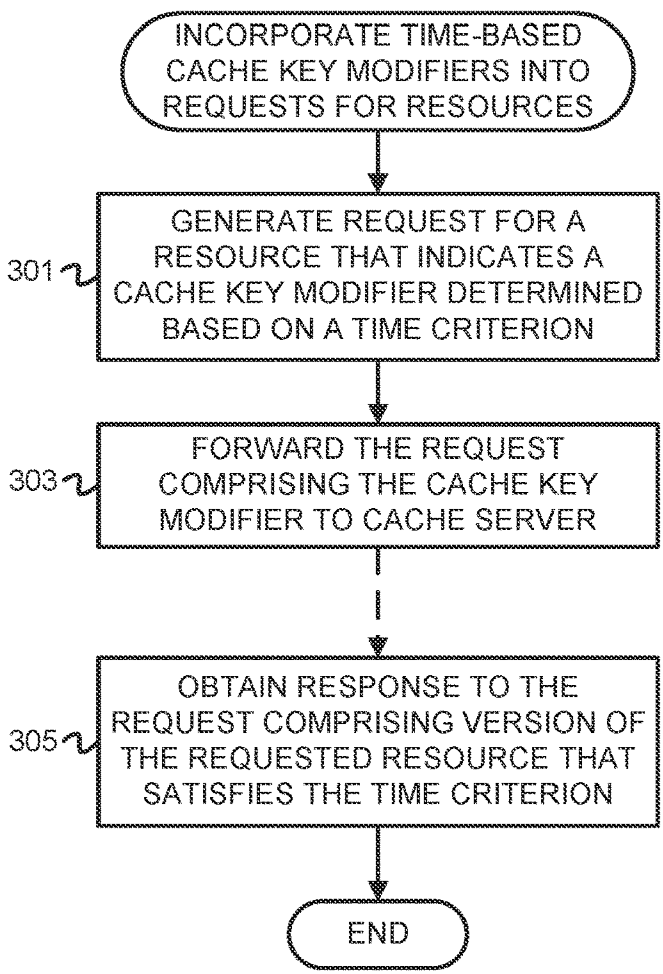
FIG. 3 is a flowchart of example operations for constructing a request for a resource that includes a time-based cache key modifier.

FIG. 3 is a flowchart of example operations for constructing a request for a resource that includes a time-based cache key modifier. The example operations are described with reference to the resource freshness manager that executes on a requestor.

At block 301, the resource freshness manager generates a request for a resource that includes a cache key modifier determined based on a time criterion. The resource freshness manager has been configured with a policy to modify outbound requests for resources (e.g., HTTP requests) with a cache key modifier incorporated therein. For instance, the resource freshness manager can modify each outbound HTTP request to incorporate a cache key modifier in a custom HTTP header field (e.g., an X-header) or as a URI/URL query parameter in the request header. The resource freshness manager determines the cache key modifier based on the current time and the time criterion. The time criterion indicates how the cache key modifier should be determined based on the current time. As an example, the time criterion may indicate that the cache key modifier should be based on the current hour of the day, based on a time window of N minutes, etc. The time criterion is used to ensure that an obtained resource is at most N hours, minutes, etc. "old" in terms of how long it has been cached. If the age of the resource in terms of how long it has been cached is older than the time criterion dictates, a fresh version of the resource will be retrieved from its origin server.

At block 303, the resource freshness manager forwards the request comprising the cache key modifier to a cache server. The cache server can be an edge server with which the requestor communicates (e.g., based on an established communication connection). Subsequent operations assume that the request is valid (i.e., indicates a legitimate resource and can be fulfilled).

At block 305, the resource freshness manager obtains a response to the request that comprises a version of the requested resource that satisfies the time criterion. The transition from block 303 to block 305 is depicted with a dashed line to indicate that operations proceed when the resource freshness manager obtains the response to the request. The version of the requested resource is referred to as satisfying the time criterion since the resource should have been cached for no longer than N hours, minutes, etc. as indicated by the time criterion based on which the cache key modifier was determined.

Figure 4:
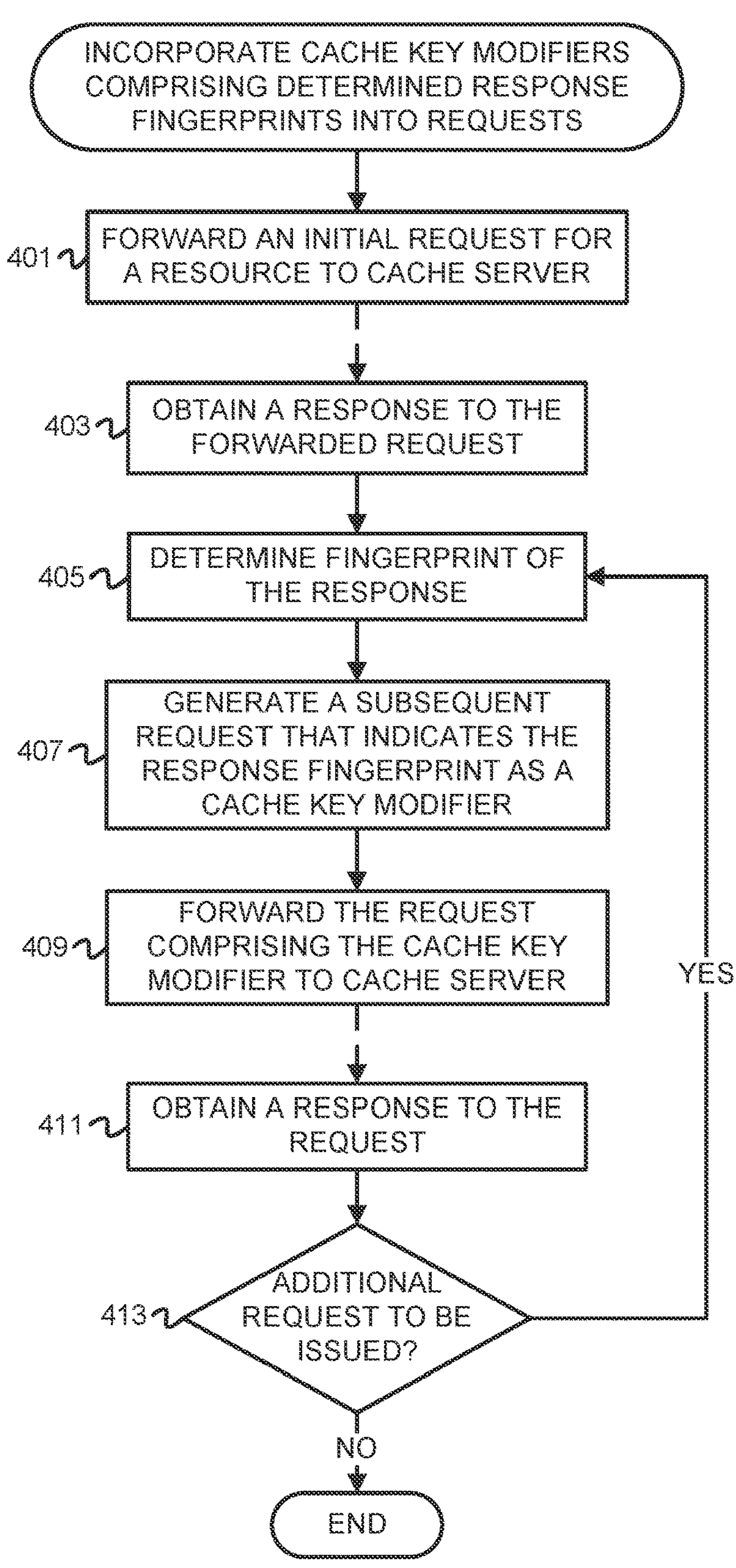
FIG. 4 is a flowchart of example operations for incorporating cache key modifiers comprising determined response fingerprints into requests.

FIG. 4 is a flowchart of example operations for incorporating cache key modifiers comprising determined response fingerprints into requests. The example operations describe a case where cache key modifiers are determined based on resources exhibiting a dependency. Resources exhibit a dependency if fulfillment of a request for a first resource involves issuing a request for a second resource, thus creating a sequence of requests (e.g., a sequence of API calls) for fulfillment. To illustrate, resources X and Y exhibit a dependency if a request for X is fulfilled by also retrieving Y, and the request for Y is subsequent to the request for X.

At block 401, the resource freshness manager forwards an initial request for a resource to the cache server. The cache server can be an edge server with which the requestor communicates (e.g., based on an established communication connection). The request may be an HTTP request. Subsequent operations assume that the request is valid (i.e., indicates a legitimate resource and can be fulfilled).

At block 403, the resource freshness manager obtains a response to the forwarded request. The transition from block 401 to block 403 is depicted with a dashed line to indicate that operations proceed when the resource freshness manager obtains the response to the request. The response may be an HTTP response to the HTTP request. The response comprises metadata/data of a corresponding resource, such as in an HTTP header.

At block 405, the resource freshness manager determines a fingerprint of the response. A fingerprint of the response is formed of one or more attributes that change when the corresponding resource has changed and/or indicate if/when the corresponding resource has changed. Examples of fingerprints of a response include an ETag or other content hash, last modified time of the resource associated with the response, cache refresh time of the resource associated with the response, etc. The resource freshness manager can determine the fingerprint from a corresponding one or more attributes of the response or based on a time that the requestor maintains in association with the response (assuming the response was previously stored/cached). For instance, the resource freshness manager can determine the attribute(s) that forms the fingerprint from a designated HTTP response header field(s).

At block 407, the resource freshness manager generates a subsequent request that indicates the response fingerprint as a cache key modifier. The resource freshness manager has been configured with a policy to modify outbound requests for resources with a cache key modifier incorporated therein. For instance, the resource freshness manager can modify each outbound HTTP request to incorporate a cache key modifier in a custom HTTP header field (e.g., an X-header) or as a URI/URL query parameter in the request header. The resource freshness manager generates a next request with the response fingerprint in the cache key modifier field, parameter, etc. of the request.

At block 409, the resource freshness manager forwards the request comprising the cache key modifier to the cache server. Subsequent example operations also assume that this request is valid.

At block 411, the resource freshness manager obtains a response to the request. Like the transition between blocks 401 and 403, the transition from block 409 to block 411 is depicted with a dashed line to indicate that operations proceed when the resource freshness manager obtains the response to the request.

At block 413, the resource freshness manager determines if there is an additional request to be issued. The determination of whether an additional request is to be issued may be based on the implementation of the initial request on the client side (e.g., based on the initial request being defined as corresponding to two API calls in the browser/application logic). If there is an additional request to be issued, operations continue at block 405 with the response obtained at block 411. If there are no additional requests to be issued, the initial request has been fulfilled, and operations are complete.

Figure 5:
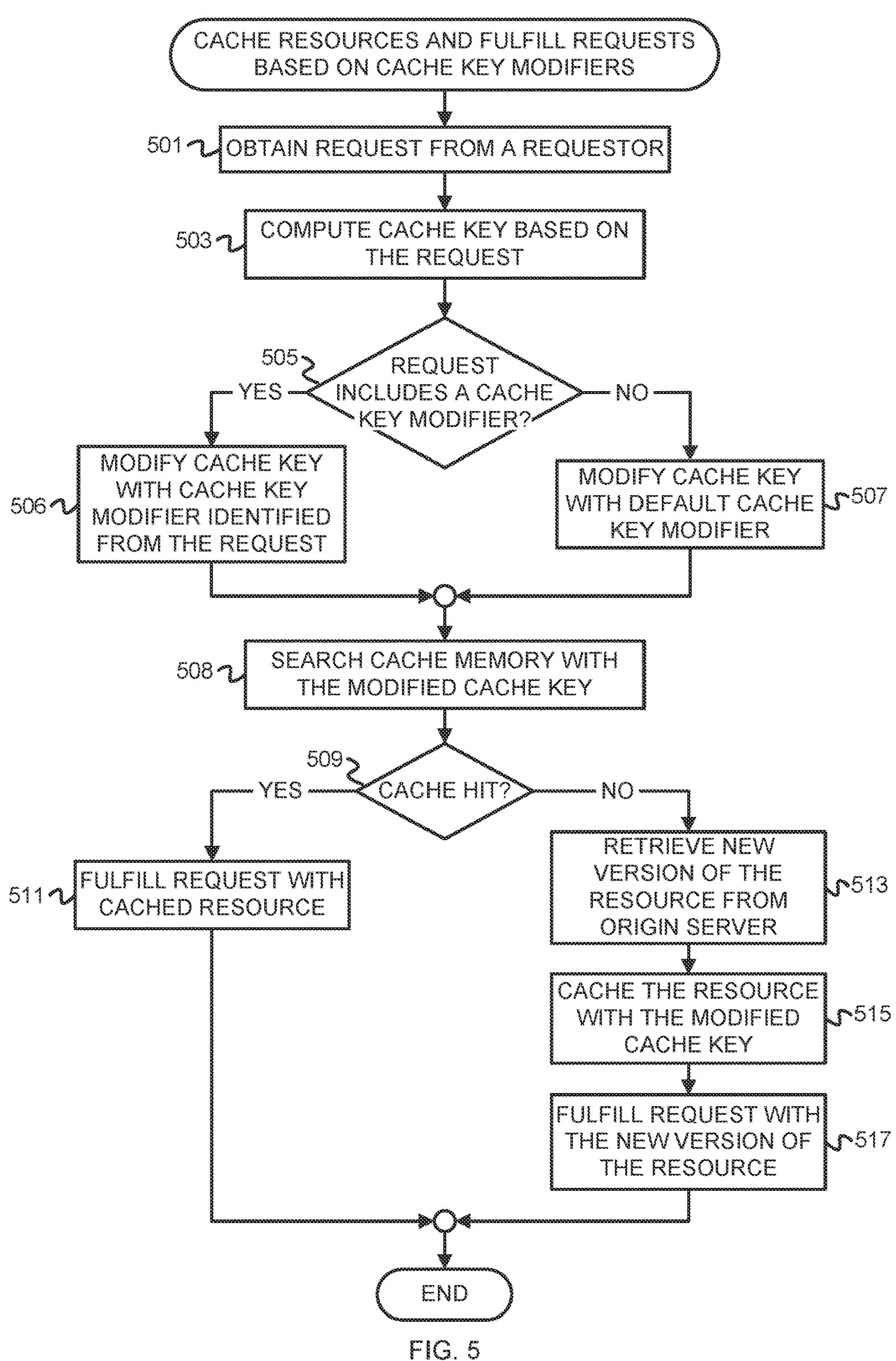
FIG. 5 is a flowchart of example operations for caching resources and fulfilling requests based on cache key modifiers.

FIG. 5 is a flowchart of example operations for caching resources and fulfilling requests based on cache key modifiers. The example operations are described with reference to the cache key modification manager that executes on a cache server (e.g., an edge cache).

At block 501, the cache key modification manager obtains a request from a requestor. The request at least identifies a resource (e.g., via its URL) and includes a cache key modifier. For instance, the request may be an HTTP request, such as a GET request for the resource. The cache key modifier may be a time-based modifier or resource dependency-based modifier as described above in reference to FIG. 3 and FIG. 4, respectively.

At block 503, the cache key modification manager computes a cache key based on the request. The cache server has been configured with a policy for computing cache keys, and this cache policy is maintained by or accessible to the cache key modification manager. This cache policy may specify one or more parameters from which the cache key modification manager computes cache keys. For instance, the cache policy may indicate that a cache key should be computed based on the hostname, path, and query string (if any) identified in an HTTP header.

At block 505, the cache key modification manager determines if the request includes a cache key modifier. The cache key modification manager determines if the requestor provided a cache key modifier in the request. If provided, the cache key modifier should have been included in a particular field(s) of the request as recognized by the cache key modification manager (i.e., in a field agreed upon between the requestor and cache key modification manager as that storing cache key modifiers), such as in a predetermined header field (e.g., an HTTP X-header) or in a query parameter of the URI/URL. The cache key modification manager checks this field(s) of the request to determine if a cache key modifier is included therein. If the request includes a cache key modifier, operations continue at block 506. If the request does not include a cache key modifier, operations continue at block 507.

At block 506, the cache key modification manager modifies the cache key with the cache key modifier identified from the request. The cache policy also indicates how cache keys should be modified with cache key modifiers. The cache policy can specify that cache key modification should be performed by prepending cache key modifiers to cache keys such that the cache key modifier serves as a cache key prefix. As another example, the cache policy can specify that cache key modification should be performed by appending cache key modifiers to cache keys such that the cache key modifier serves as a cache key suffix. As yet another example, the cache policy can dictate that cache key modification should be performed by infixing cache key modifiers in cache keys (e.g., at a character-count based position or other position in the cache key specified by the cache policy) such that the cache key modifier serves as a cache key infix.

At block 507, the cache key modification manager modifies the cache key with a default cache key modifier. The cache policy can indicate a that a default cache key modifier should be used if the requestor of a resource did not specify a cache key modifier in the request. The default cache key modifier can be an empty string or null value, for instance. The cache key modification manager modifies the cache key in accordance with the cache policy as similarly described at block 506.

At block 508, the cache key modification manager searches cache memory with the modified cache key. The cache key modification manager has access to cache memory of the cache server that comprises key-value pairs for cached resources. The cache key modification manager performs a lookup in cache memory with the modified cache key.

At block 509, the cache key modification manager determines if the cache lookup resulted in a cache hit. If the cache lookup resulted in a cache hit, operations continue at block 511. If the cache lookup did not result in a cache hit (i.e., resulted in a cache miss), operations continue at block 513.

At block 511, the cache key modification manager fulfills the request with the cached resource. The cache key modification manager generates a response comprising the cached resource (e.g., an HTTP response with a 200 status code) and responds to the request with the response. The cache key modification manager can retrieve the cached resource from storage based on the storage location indicated in the entry of cache memory for which the lookup yielded the cache hit (i.e., the entry with a cache key matching the modified cache key generated at block 505).

At block 513, the cache key modification manager retrieves a new version of the resource from its origin server. The cache key modification manager can forward the request to the origin server to retrieve the newest available version of the resource in response.

At block 515, the cache key modification manager caches the resource with the modified cache key. The cache key modification manager caches the version of the resource retrieved from the origin server and includes the modified cache key as the cached resource's cache key, which can comprise inserting a key-value pair into cache memory that includes the modified cache key.

At block 517, the cache key modification manager fulfills the request with the new version of the resource. The cache key modification manager can forward the response obtained from the origin server to the requestor to fulfill the request.

Figure 6:
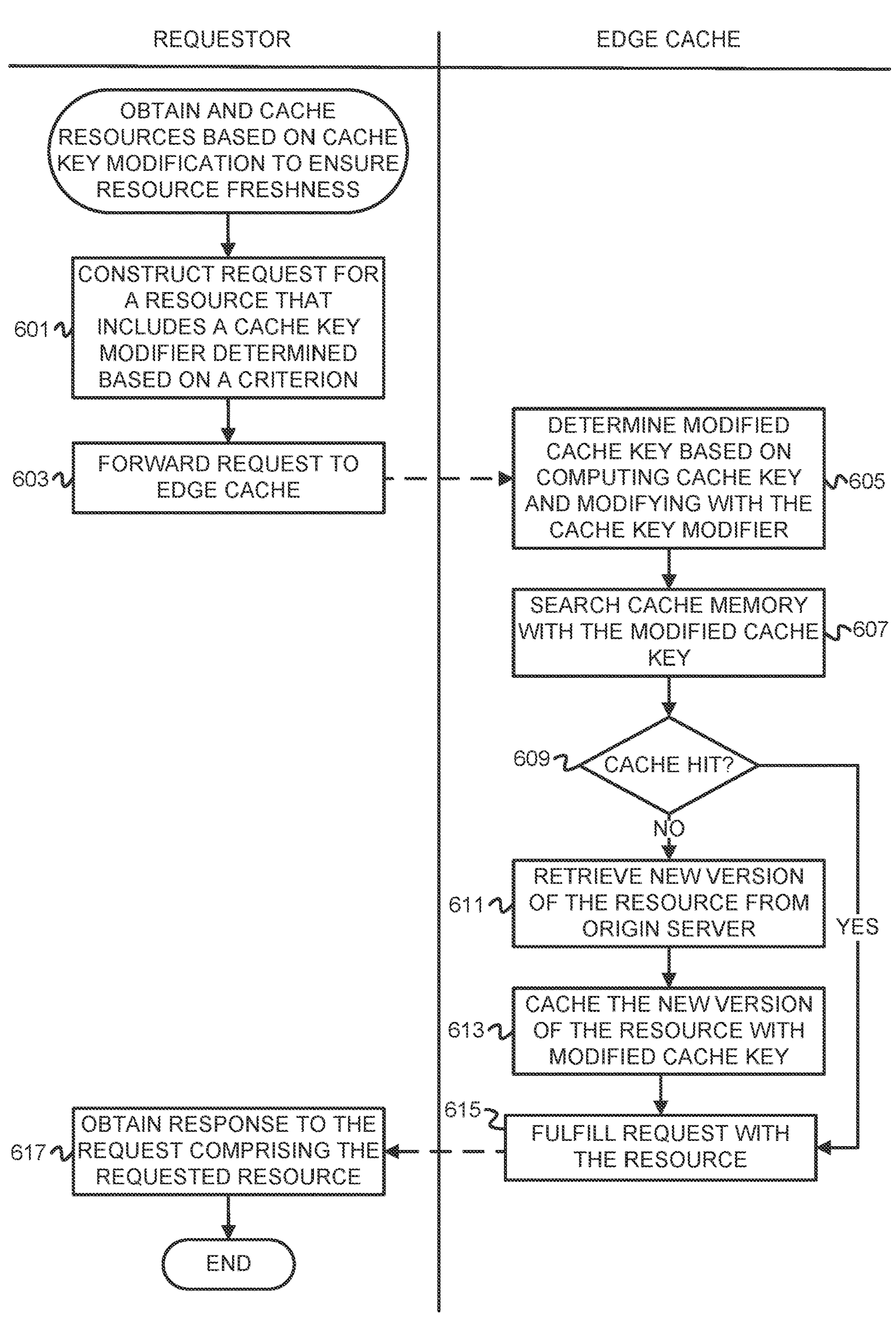
FIG. 6 is a flowchart of example operations for ensuring freshness of obtained and cached resources based on cache key modification.

FIG. 6 is a flowchart of example operations for ensuring freshness of obtained and cached resources based on cache key modification. The example operations refer to operations performed at a requestor and an edge cache by the resource freshness manager and the cache key modification manager, respectively. Transitions between example operations that are depicted with dashed lines indicate that flow transitions between entities (i.e., from requestor to edge cache or vice-versa) based on communication of a request and a corresponding response.

At block 601, the cache freshness manager constructs a request for a resource that includes a cache key modifier determined based on a criterion. The cache freshness manager may have been configured with a policy to modify at least a subset of outbound requests (e.g., HTTP requests) to incorporate a cache key modifier determined according to a criterion. The criterion can be based on time as described in reference to FIG. 3 or based on dependencies between resources as described in reference to FIG. 4. The cache freshness manager can incorporate the cache key modifier into the request header, as a query parameter, etc.

At block 603, the cache freshness manager forwards the request to the edge cache server. The cache freshness manager waits for a response to the request that is forwarded to the edge cache. Example operations continue at the edge cache upon receipt of the request.

At block 605, the cache key modification manager determines a modified cache key based on computing a cache key and modifying the cache key with the cache key modifier. The cache key modification manager has been configured with a cache policy that specifies how cache keys should be computed. The cache policy indicates that each cache key should have a cache key modifier incorporated therein, where the cache key modifier can have a default value if a cache key modifier was not included in the corresponding request. The cache key modifier determines a cache key and modifies the cache key with the cache key modifier identified in the request according to this cache policy.

At block 607, the cache key modification manger searches cache memory with the modified cache key. The cache key modification manager performs a lookup in cache memory using the modified cache key.

At block 609, the cache key modification manager determines if the search yielded a cache hit. The search yielded a cache hit if the modified cache key matches an identifier (i.e., the cache key) of an entry in cache memory that identifies a cached resource. If the search yielded a cache miss, operations continue at block 611. If the search yielded a cache hit, operations continue at block 615.

At block 611, the cache key modification manager retrieves a new version of the resource from its origin server. The cache key modification manager requests the resource from its origin server and obtains in response (e.g., in a corresponding HTTP response) a new version of the resource.

At block 613, the cache key modification manager caches the new version of the resource with the modified cache key. The cache key modification manager creates a new entry in cache memory comprising data/metadata of the resource retrieved from the origin server and having the modified cache key as its identifier/cache key. The cache key modification manager can also store data/metadata of the resource in storage of the edge cache (e.g., in disk storage), where the entry in cache memory identifies the location in storage from which the resource can be retrieved upon subsequent lookups in cache memory with the modified cache key that yield a cache hit.

At block 615, the cache key modification manager fulfills the request with the resource. The resource with which the request is fulfilled is either a cached version of the resource if the lookup with the modified cache key resulted in a cache hit or a new version of the resource obtained from its origin server if the lookup with the modified cache key yielded a cache miss. The cache key modification manager communicates a response (e.g., an HTTP response) to the requestor. Example operations continue at the requestor upon receipt of the response.

At block 617, the cache key modification manager obtains a response to the request comprising the requested resource. While not depicted in FIG. 6 for simplicity, if the response triggers another request to fulfill the original request at block 601 (e.g., is one of a sequence of interdependent API calls), operations can return to block 601 for construction of a request that includes a response fingerprint of the response.

Variations

The Figures refer to requests and responses communicated between a requestor, a cache server, and an origin server with HTTP/HTTPS in illustrative examples. In implementations, requests and responses can be communicated according to other protocols that are based on a client-server model, such as the File Transfer Protocol (FTP).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
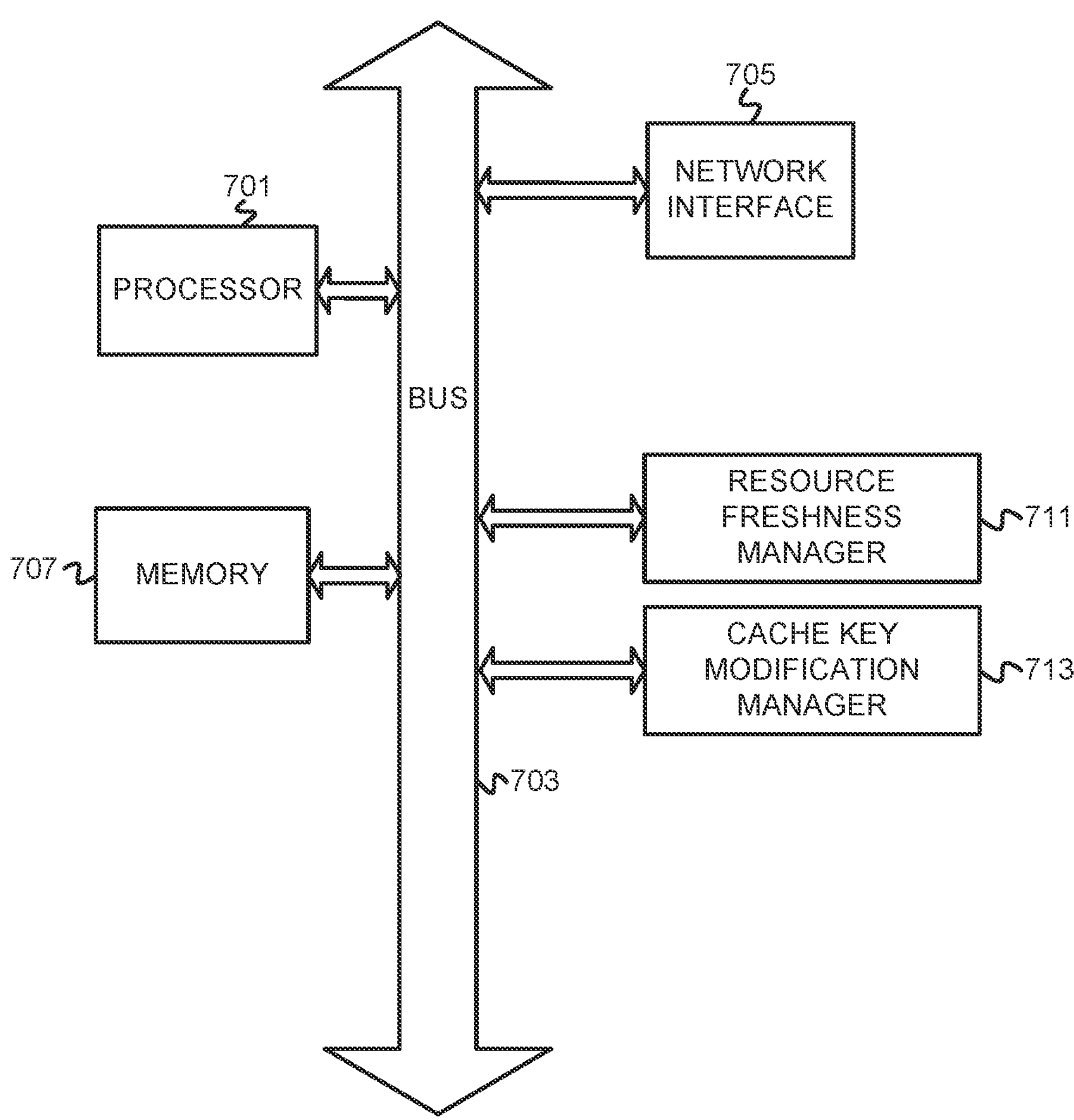
FIG. 7 depicts an example computer system with a resource freshness manager and a cache key modification manager.

FIG. 7 depicts an example computer system with a resource freshness manager and a cache key modification manager. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes resource freshness manager 711 and cache key modification manager 713. The resource freshness manager 711 incorporates cache key modifiers into requests for resources that may be cached, where cache key modifiers are determined based on a criterion that may be time-based or based on a previously received response. The cache key modification manager 713 generates modified cache keys for cache memory lookups based on cache key modifiers identified in requests. While depicted as part of the same computer system in FIG. 7 for simplicity, the resource freshness manager 711 and cache key modification manager 713 likely do not execute as part of the same system in implementations. For instance, the resource freshness manager 711 can execute on a client endpoint or a server (e.g., a proxy server or intermediate cache server), and the cache key modification manager 713 can execute on a cache server, which may be a higher level cache server in a multi-tier edge cache system. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

constructing, by a first device, a first request for a first resource that comprises a cache key modifier, wherein constructing the first request for the first resource comprises, determining the cache key modifier based on a first criterion, wherein determining the cache key modifier based on the first criterion comprises determining the cache key modifier based on a current time or determining the cache key modifier based on one or more fingerprints of a first response previously obtained by the first device; and incorporating the cache key modifier in at least one of a header field and a query parameter of the first request for the first resource;

communicating the first request by the first device to a cache server;

generating, by the cache server, a modified cache key based on identifying the cache key modifier in the first request, wherein generating the modified cache key comprises, determining a cache key; and modifying the cache key with the cache key modifier to generate the modified cache key; and fulfilling the first request based on a result of searching cache memory of the cache server for the first resource with the modified cache key.

2. The method of claim 1, wherein fulfilling the first request comprises, based on searching of the cache memory with the cache key resulting in a cache miss, retrieving a new version of the first resource from an origin server;

caching the new version of the first resource with the modified cache key as a key; and fulfilling the first request with the new version of the first resource; and based on searching of the cache memory resulting in a cache hit, fulfilling the first request with the first resource from the cache server.

3. The method of claim 1, wherein the first criterion indicates a time criterion, wherein determining the cache key modifier based on the first criterion comprises determining the cache key modifier based on the current time and the time criterion.

4. The method of claim 1, wherein the first device previously obtained the first response to a previous request for a second resource on which the first resource is dependent, wherein determining the cache key modifier based on the first criterion comprises determining the one or more fingerprints of the previously obtained response corresponding to the second resource based on the first criterion.

5. The method of claim 4 further comprising determining the one or more fingerprints of the first response based on the first criterion, wherein the first criterion indicates at least one of one or more response header fields, one or more response body elements, and time maintained by the first device.

6. The method of claim 5, wherein the one or more fingerprints of the first response comprise one or more of a last modified time, a content hash, and a cache refresh time of the second resource.

7. The method of claim 1, wherein modifying the cache key based on the cache key modifier comprises prepending the cache key modifier to the cache key, appending the cache key modifier to the cache key, or infixing the cache key modifier into the cache key.

8. The method of claim 1, wherein the first request comprises a Hypertext Transfer Protocol (HTTP) request, and wherein incorporating the cache key modifier in at least one of the header field and the query parameter of the first request comprises incorporating the cache key modifier in at least one of an HTTP header of the HTTP request and a uniform resource indicator (URI) query parameter indicated in the HTTP header.

9. The method of claim 1, wherein the first device comprises a web browser, a web proxy, or an intermediate cache server.

10. One or more non-transitory machine-readable media having program code stored thereon, the program code comprising instructions to:

obtain a request for an asset from a client;

determine whether the request comprises a cache key modifier based on a header of the request;

based on a determination that the request comprises a cache key modifier, generate a modified cache key based on the cache key modifier, wherein the cache key modifier was determined by the client based on a current time or based on one or more fingerprints of a response previously obtained by the client, wherein the instructions to generate the modified cache key comprise instructions to, compute a cache key; and modify the cache key with the cache key modifier, wherein the modified cache key comprises the cache key as modified by the cache key modifier; and fulfill the request for the asset based on a determination of whether the modified cache key identifies a cached version of the asset.

11. The non-transitory machine-readable media of claim 10, wherein the instructions to determine whether the request comprises a cache key modifier comprise instructions to determine whether the header of the request comprises at least one of a header field and a query parameter that corresponds to a cache key modifier.

12. The non-transitory machine-readable media of claim 10, wherein the program code further comprises instructions to, based on a determination that the request does not comprise a cache key modifier, generate the modified cache key based on a default cache key modifier.

13. The non-transitory machine-readable media of claim 12, wherein the default cache key modifier comprises an empty string or a null value.

14. The non-transitory machine-readable media of claim 10, wherein the cache key modifier comprises a cache key prefix, a cache key infix, or a cache key suffix, and wherein the instructions to generate the modified cache key comprise instructions to prepend the cache key modifier to the cache key, infix the cache key modifier to the cache key, or append the cache key modifier to the cache key.

15. A system comprising:

a first device comprising a first processor and a first machine-readable medium having instructions stored thereon that are executable by the first processor to cause the first device to, construct a request for a resource that comprises a cache key modifier, wherein the instructions to construct the request for the resource comprise instructions to, determine the cache key modifier based on a first criterion, wherein the instructions executable by the first processor to cause the first device to determine the cache key modifier based on the first criterion comprise instructions executable by the first processor to cause the first device to determine the cache key modifier based on a current time or based on one or more fingerprints of a response previously obtained by the first device; and incorporate the cache key modifier in at least one of a header field and a query parameter of the request for the resource;

a cache server comprising a second processor and a second machine-readable medium having instructions stored thereon that are executable by the second processor to cause the cache server to, generate a modified cache key based on the cache key modifier, wherein the instructions executable by the second processor to cause the cache server to generate the modified cache key comprise instructions executable by the second processor to cause the cache server to, based on computation of a cache key upon receiving the request for the resource, modify the cache key with the cache key modifier to generate the modified cache key; and fulfill the request based on a result of searching cache memory of the cache server for the resource with the modified cache key.

16. The system of claim 15, wherein the first criterion indicates a time criterion, and wherein the instructions executable by the first processor to cause the first device to determine the cache key modifier based on the first criterion comprise instructions executable by the first processor to cause the first device to determine the cache key modifier based on the current time and the time criterion.

17. The system of claim 15, wherein the first device previously obtained the response to a previous request for another resource on which the resource is dependent, and wherein the instructions executable by the first processor to cause the first device to determine the cache key modifier based on the first criterion comprise instructions executable by the first processor to cause the first device to determine the one or more fingerprints of the previously obtained response based on the first criterion.

18. The system of claim 17, wherein the first criterion indicates one or more response header fields, and wherein the instructions executable by the first processor to cause the first device to determine the one or more fingerprints comprise instructions executable by the first processor to cause the first device to determine the one or more fingerprints based on at least one of a header field of the previously obtained response, a response body element of the previously obtained response, and a cache refresh time associated with the previously obtained response.

19. The system of claim 15, wherein the cache key modifier comprises a cache key prefix, a cache key infix, or a cache key suffix, and wherein the instructions executable by the second processor to cause the cache server to modify the cache key with the cache key modifier comprise instructions executable by the second processor to cause the cache server to prepend the cache key modifier to the cache key, infix the cache key modifier to the cache key, or append the cache key modifier to the cache key.

20. The system of claim 15, wherein the first device is a client endpoint, an intermediate cache server, or a proxy server.

* * * * *